United States Patent
Bostick et al.

(10) Patent No.: US 10,606,258 B2
(45) Date of Patent: *Mar. 31, 2020

(54) DYNAMIC ANALYSIS OF REAL-TIME RESTRICTIONS FOR REMOTE CONTROLLED VEHICLES

(71) Applicant: INTERNATIONAL BUSINESS MACHINES CORPORATION, Armonk, NY (US)

(72) Inventors: James E. Bostick, Cedar Park, TX (US); John M. Ganci, Jr., Raleigh, NC (US); Martin G. Keen, Cary, NC (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/169,052

(22) Filed: Oct. 24, 2018

(65) Prior Publication Data

US 2019/0056727 A1  Feb. 21, 2019

Related U.S. Application Data

(63) Continuation of application No. 15/086,723, filed on Mar. 31, 2016, now Pat. No. 10,168,696.

(51) Int. Cl.
*G05D 1/00* (2006.01)
*G08G 5/00* (2006.01)
*G05D 1/10* (2006.01)

(52) U.S. Cl.
CPC .......... *G05D 1/0022* (2013.01); *G05D 1/106* (2019.05); *G08G 5/006* (2013.01); *G08G 5/0026* (2013.01);

(Continued)

(58) Field of Classification Search
CPC ........ G05D 1/002; G05D 1/005; G05D 1/042; G05D 1/0212; G05D 1/0214; G05D 1/08;
(Continued)

(56) References Cited

U.S. PATENT DOCUMENTS 7,228,232 B2 * 6/2007 Bodin .................... G01C 23/00
701/301
9,087,451 B1 7/2015 Jarrell
(Continued)

FOREIGN PATENT DOCUMENTS

| CN | 101833870 | 9/2010 |
| CN | 103196430 | 7/2013 |
| CN | 102854883 | 10/2014 |

OTHER PUBLICATIONS

Anderson, Chris, "A clever design exercise in visualizing drone no-fly zones", DIY Drones, Posted on Aug. 25, 2014 at 8:24 pm, 11 pages, <http://diydrones.com/profiles/blogs/a-clever-design-exercise-in-visualizing-drone-no-fly-zones>.

(Continued)

*Primary Examiner* — Richard A Goldman
(74) *Attorney, Agent, or Firm* — James Nock; Andrew D. Wright; Roberts Mlotkowski Safran Cole & Calderon, P.C.

(57) ABSTRACT

Dynamic analysis and updating real-time restrictions for remote controlled vehicles. Remote controlled vehicles are subject to geospatial restrictions that are updated in real time; dynamic analysis of geospatial restrictions allows for proper operation of a remote controlled vehicle.

20 Claims, 3 Drawing Sheets

(52) U.S. Cl.
CPC ......... *G08G 5/0039* (2013.01); *G08G 5/0069* (2013.01); *G08G 5/0082* (2013.01)

(58) Field of Classification Search
CPC .............. B64C 39/024; B64C 2201/00; B64C 2201/14; B64C 2201/141; B64C 2201/146; G08G 5/0047; G08G 5/006; G08G 5/0069; H04W 4/021
USPC ............................ 701/2, 3, 26, 301; 244/190
See application file for complete search history.

(56) References Cited

U.S. PATENT DOCUMENTS

| | | | | |
|---|---|---|---|---|
| 9,508,263 | B1* | 11/2016 | Teng | B64C 39/024 |
| 9,740,208 | B2* | 8/2017 | Sugumaran | B64C 39/024 |
| 9,794,299 | B2* | 10/2017 | Votaw | H04L 63/105 |
| 2007/0156653 | A1* | 7/2007 | Garg | G06F 16/9554 |
| 2008/0072284 | A1* | 3/2008 | Horvitz | G06F 17/50 726/2 |
| 2010/0250497 | A1* | 9/2010 | Redlich | F41H 13/00 707/661 |
| 2013/0282440 | A1* | 10/2013 | Isaac | G06Q 30/02 705/7.35 |
| 2013/0317667 | A1* | 11/2013 | Kruglick | B64C 39/024 701/2 |
| 2014/0022051 | A1* | 1/2014 | Levien | G05D 1/0011 340/5.2 |
| 2014/0188997 | A1* | 7/2014 | Schneiderman | H04L 51/32 709/204 |
| 2015/0142211 | A1* | 5/2015 | Shehata | H04N 7/181 701/2 |
| 2015/0254988 | A1* | 9/2015 | Wang | G05D 1/0214 701/3 |
| 2015/0370251 | A1* | 12/2015 | Siegel | G05D 1/0027 701/2 |
| 2016/0018822 | A1* | 1/2016 | Nevdahs | G05D 1/0094 701/26 |
| 2016/0212075 | A1* | 7/2016 | Fang | G06F 16/245 |
| 2016/0225264 | A1* | 8/2016 | Taveira | G05D 1/102 |
| 2016/0246297 | A1* | 8/2016 | Song | G05D 1/0022 |
| 2016/0283678 | A1* | 9/2016 | Ram | G06F 19/3475 |
| 2016/0315909 | A1* | 10/2016 | von Gravrock | H04L 12/283 |
| 2016/0315955 | A1* | 10/2016 | Beatty | H04L 63/1416 |
| 2017/0025021 | A1* | 1/2017 | Song | G08G 5/0034 |
| 2017/0031365 | A1* | 2/2017 | Sugumaran | B64C 39/024 |
| 2017/0069214 | A1* | 3/2017 | Dupray | G08G 5/0021 |
| 2017/0076610 | A1* | 3/2017 | Liu | B64C 39/024 |
| 2017/0103659 | A1* | 4/2017 | Jin | G08G 5/006 |
| 2017/0132541 | A1* | 5/2017 | Myers | G06Q 10/06311 |
| 2017/0132937 | A1* | 5/2017 | Zeng | G08G 5/006 |
| 2017/0187754 | A1* | 6/2017 | Votaw | H04L 63/105 |
| 2017/0205897 | A1* | 7/2017 | Chun | G06F 3/03 |
| 2017/0279867 | A1* | 9/2017 | Morton | H04W 4/21 |
| 2017/0285632 | A1* | 10/2017 | Bostick | G08G 5/0026 |
| 2018/0129487 | A1* | 5/2018 | Hernandez-Sherrington | G06F 8/41 |

OTHER PUBLICATIONS

Berlinger et al., "2 airliners fly within 100 feet of drone above New York", CNN, Updated 6:42 pm et, Mon Aug. 3, 2015, 2 pages, <http://www.cnn.com/2015/08/01/us/drone-airliner-jfk/>.
"Drones hamper US firefighting efforts", BBC News, Jul. 20, 2015, 8 pages, <http://www.bbc.com/news/technology-33593981 >.
"Method and System for Drone Route Selection and Altitude Based on Payload", An Ip.com Prior Art Database Technical Disclosure, Authors et al.: Disclosed Anonymously, IP.com No. 000243699, accessed Mar. 31, 2016, 4 pages.

* cited by examiner

DYNAMIC ANALYSIS OF REAL-TIME RESTRICTIONS FOR REMOTE CONTROLLED VEHICLES

BACKGROUND

The present invention relates generally to the field of vehicle control, guidance, operation or indication, and more particularly to a remote control system.

Remote controlled vehicles have become increasingly popular both for commercial and recreational uses. However, remote controlled vehicles in the sky have caused significant safety issues. Some remote controlled vehicles create a significant amount of noise. This noise can be distracting to other people around the remote controlled vehicle (e.g., at a wedding, at a funeral). Some remote controlled vehicles create a safety risk by flying above people and property. Some remote controlled vehicles fly over occupied spaces (e.g., over an outdoor festival, over a park). Some remote controlled vehicles create a privacy risk. Some remote controlled vehicles use cameras to capture photographs and videos of private or intimate moments.

SUMMARY

According to an aspect of the present invention, there is a method, computer program product, and/or system that performs the following operations (not necessarily in the following order): (i) determining a first geographic location of a remote controlled vehicle; (ii) identifying a set of geographic restrictions for the remote controlled vehicle; and (iii) adjusting the first geographic location of the remote controlled vehicle to a second geographic location based, at least in part, on the set of geographic restrictions. At least determining the first geographic location is performed by computer software running on computer hardware.

DETAILED DESCRIPTION

Figure 1:
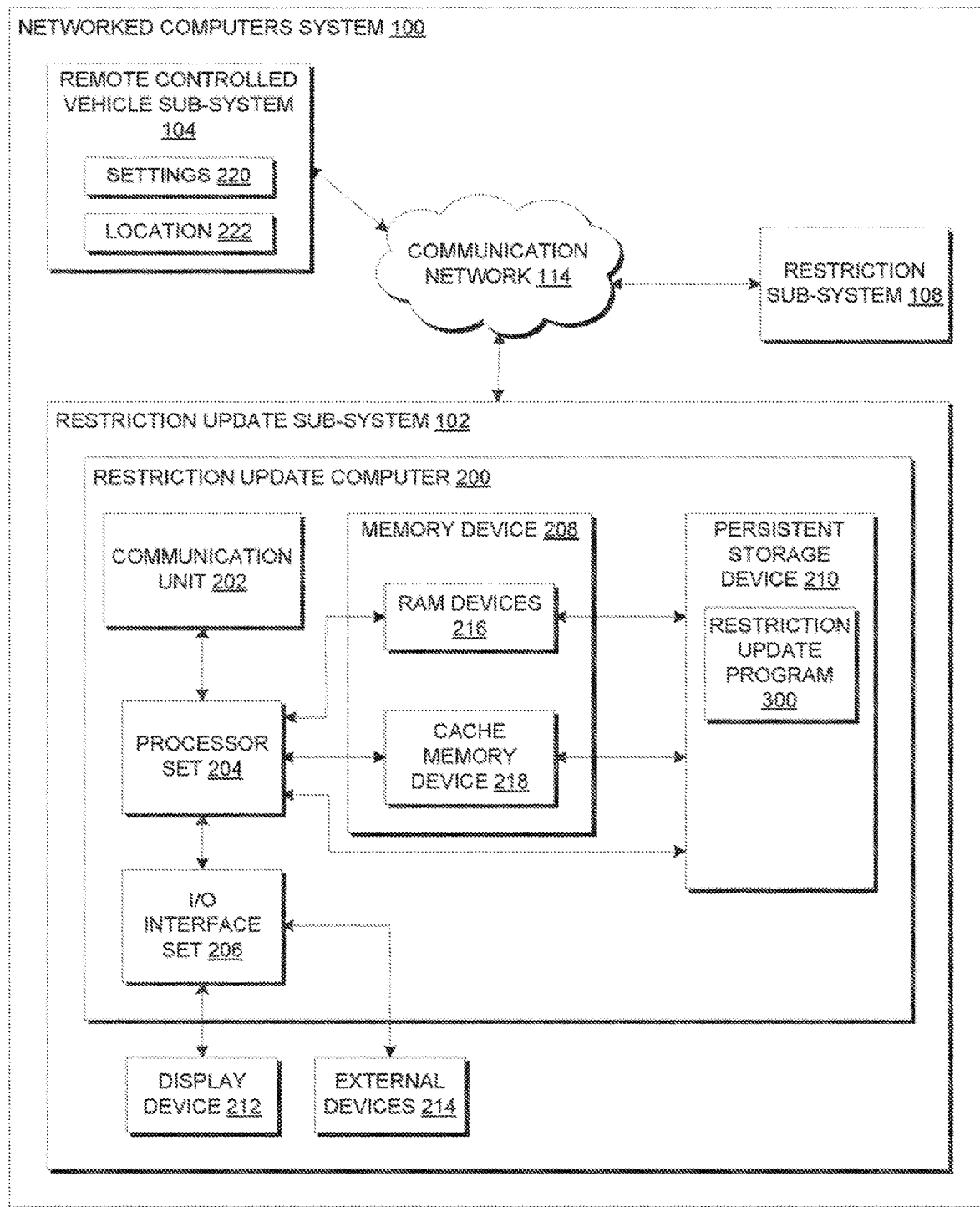
FIG. 1 is a block diagram view of a first embodiment of a system according to the present invention.

Dynamic analysis and updating real-time restrictions for remote controlled vehicles. Remote controlled vehicles are subject to geospatial restrictions that are updated in real time; dynamic analysis of geospatial restrictions allows for proper operation of a remote controlled vehicle. This Detailed Description section is divided into the following sub-sections: (i) Hardware and Software Environment; (ii) Example Embodiment; (iii) Further Comments and/or Embodiments; and (iv) Definitions.

I. Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions to use state information and personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: restriction update sub-system 102; remote controlled vehicle sub-systems 104, 106; restriction sub-system 108; and communication network 114. Restriction update sub-system 102 contains: restriction update computer 200; display device 212; and external devices 214. Restriction update computer 200 contains: communication unit 202; processor set 204; input/output (110) interface set 206; memory device 208; and persistent storage device 210. Memory device 208 contains: random access memory (RAM) devices 216; and cache memory device 218. Persistent storage device 210 contains: restriction update program 300.

Restriction update sub-system 102 is, in many respects, representative of the various computer sub-systems in the present invention. Accordingly, several portions of restriction update sub-system 102 will now be discussed in the following paragraphs.

Restriction update sub-system 102 may be a laptop computer, a tablet computer, a netbook computer, a personal computer (PC), a desktop computer, a personal digital assistant (PDA), a smart phone, or any programmable electronic device capable of communicating with client sub-systems via communication network 114. Restriction update program 300 is a collection of machine readable instructions and/or data that is used to create, manage, and control certain software functions that will be discussed in detail, below, in the Example Embodiment sub-section of this Detailed Description section.

Restriction update sub-system 102 is capable of communicating with other computer sub-systems via communication network 114. Communication network 114 can be, for example, a local area network (LAN), a wide area network (WAN) such as the Internet, or a combination of the two, and can include wired, wireless, or fiber optic connections. In general, communication network 114 can be any combination of connections and protocols that will support communications between restriction update sub-system 102 and client sub-systems.

Restriction update sub-system 102 is shown as a block diagram with many double arrows. These double arrows (no separate reference numerals) represent a communications fabric, which provides communications between various components of restriction update sub-system 102. This communications fabric can be implemented with any architecture designed for passing data and/or control information between processors (such as microprocessors, communications processors, and/or network processors, etc.), system memory, peripheral devices, and any other hardware components within a system. For example, the communications fabric can be implemented, at least in part, with one or more buses.

Memory device 208 and persistent storage device 210 are computer readable storage media. In general, memory device 208 can include any suitable volatile or non-volatile computer readable storage media. It is further noted that, now and/or in the near future: (i) external devices 214 may be able to supply some, or all, memory for restriction update sub-system 102; and/or (ii) devices external to restriction update sub-system 102 may be able to provide memory for restriction update sub-system 102.

Restriction update program 300 is stored in persistent storage device 210 for access and/or execution by one or more processors of processor set 204, usually through memory device 208. Persistent storage device 210: (i) is at least more persistent than a signal in transit; (ii) stores the program (including its soft logic and/or data) on a tangible medium (such as magnetic or optical domains); and (iii) is substantially less persistent than permanent storage. Alternatively, data storage may be more persistent and/or permanent than the type of storage provided by persistent storage device 210.

Restriction update program 300 may include both substantive data (that is, the type of data stored in a database) and/or machine readable and performable instructions. In this particular embodiment (i.e., FIG. 1), persistent storage device 210 includes a magnetic hard disk drive. To name some possible variations, persistent storage device 210 may include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage device 210 may also be removable. For example, a removable hard drive may be used for persistent storage device 210. Other examples include optical and magnetic disks, thumb drives, and smart cards that are inserted into a drive for transfer onto another computer readable storage medium that is also part of persistent storage device 210.

Communication unit 202, in these examples, provides for communications with other data processing systems or devices external to restriction update sub-system 102. In these examples, communication unit 202 includes one or more network interface cards. Communication unit 202 may provide communications through the use of either or both physical and wireless communications links. Any software modules discussed herein may be downloaded to a persistent storage device (such as persistent storage device 210) through a communications unit (such as communication unit 202).

I/O interface set 206 allows for input and output of data with other devices that may be connected locally in data communication with restriction update computer 200. For example, I/O interface set 206 provides a connection to external devices 214. External devices 214 will typically include devices, such as a keyboard, a keypad, a touch screen, and/or some other suitable input device. External devices 214 can also include portable computer readable storage media, such as, for example, thumb drives, portable optical or magnetic disks, and memory cards. Software and data used to practice embodiments of the present invention (e.g., restriction update program 300) can be stored on such portable computer readable storage media. In these embodiments, the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus, the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiments

Figure 2:
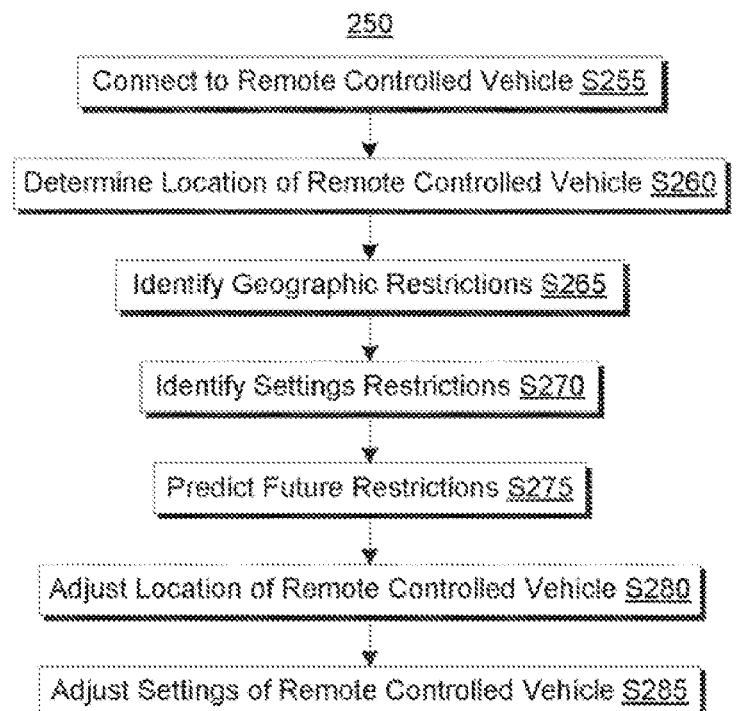
FIG. 2 is a flowchart showing a first embodiment method performed, at least in part, by the first embodiment system.
Figure 3:
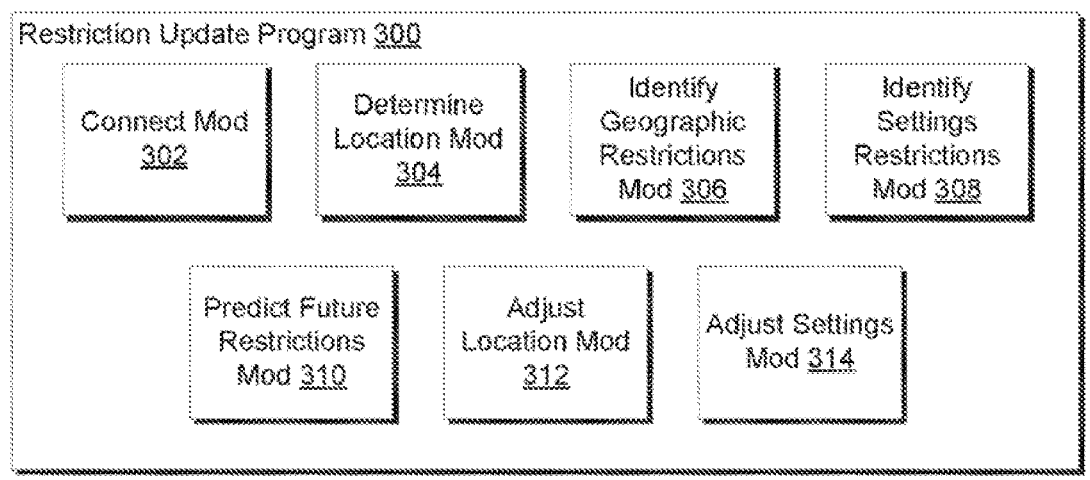
FIG. 3 is a block diagram view of a machine logic (e.g., software) portion of the first embodiment system.

FIG. 2 shows flowchart 250 depicting a method according to the present invention. FIG. 3 shows restriction update program 300, which performs at least some of the method operations of flowchart 250. This method and associated software will now be discussed, over the course of the following paragraphs, with extensive reference to FIG. 2 (for the method operation blocks) and FIG. 3 (for the software blocks). In this example John is operating a remote controlled car in a public park near an outdoor concert and the remote controlled car contains a horn.

Processing begins at operation S255, where connect module ("mod") 302 connects to a remote controlled vehicle. In some embodiments of the present invention, connect mod 302 connects to a remote controlled vehicle through a wireless connection. A remote controlled vehicle includes any vehicle that is not controlled from within the vehicle by a person. A remote controlled vehicle can be controlled by a computer. Alternatively, a remote controlled vehicle can be controlled by a person that is not within and/or on the vehicle. For example, a remote controlled vehicle can be, but is not limited to a train, a car, a helicopter, a plane, or a boat. In some of these embodiments, connect mod 302 connects to a remote controlled vehicle through at least one of: (i) a radio frequency (RF) network connection; (ii) an infrared (IR) network connection; (iii) an encrypted network connection; (iv) a cellular network connection; (v) an alternative network connection; and/or (vi) a combination of network connections. In this example, John powers on his remote controlled vehicle and connect mod 302 connects to the remote controlled vehicle using an encrypted RF network connection.

Processing proceeds to operation S260, where determine location mod 304 determines a geographic location for a remote controlled vehicle. In some embodiments of the present invention, determine location mod 304 determines a relative location of a remote controlled vehicle. Alternatively, determine location mod 304 determines an absolute location of a remote controlled vehicle. In other embodiments, determine location mod 304 determines a location of a remote controlled vehicle based, at least in part, on a global positioning system (GPS). Alternatively, determine location mod 304 determines a location of a remote controlled vehicle based, at least in part, on at least one of: (i) a cellular network; (ii) a wireless network; (iii) image geotagging; (iv) topographical analysis; and/or (v) a combination of location determination means. Topographical analysis includes an analysis of topographical features around a remote controlled vehicle to determine a location. Alternatively, topographical analysis includes an analysis of topographical features around a remote controlled vehicle to determine a location, wherein the topographical features are: (i) analyzed on an image; and/or (ii) analyzed on a camera display. In this example, determine location mod 304 uses a GPS to determine that John's remote controlled vehicle is located in an outdoor park.

Processing proceeds to operation S265, where identify geographic restrictions mod 306 identifies a set of geographic restrictions for a remote controlled vehicle. In some embodiments of the present invention, identify geographic restrictions mod 306 identifies a set of geographic restrictions. In some of these embodiments, identify geographic restrictions mod 306 identifies a set of geographic restrictions by searching social media networks. Alternatively, identify geographic restrictions mod 306 identifies geographic restrictions by searching websites and/or public postings for: (i) police departments, fire departments, and/or other emergency services; (ii) government agencies (e.g., communications agencies, aviation agencies, military agencies); (iii) event and/or facility websites (e.g., parks, wedding venues, concert venues, sporting events); (iv) schools; (v) maps (e.g., topographical maps, road maps); (vi) building plans and/or construction plans; and/or (vii) other locations in which a remote controlled vehicle is restricted based, at least in part, on location (e.g., aisles within a store). In other embodiments, identify geographic restrictions mod 306 identifies a set of weather conditions as a set of geographic restrictions. In some of these embodiments, identify geographic restrictions mod 306 identifies a set of weather conditions based, at least in part, on a weather reporting service. Alternatively, identify geographic restrictions mod 306 identifies a set of weather conditions based, at least in part, on a set of sensors on a remote controlled vehicle. In some embodiments, identify geographic restrictions mod 306 identifies a set of geographic restrictions that include a geo-fence. In this example, identify geographic restrictions mod 306 determines that a park website and a social media account for a band indicate a concert is occurring in the park and the park website indicates that remote controlled vehicles are not allowed within 150 feet of the stage in any direction or within 300 feet above the ground (sometimes also referred to as a height, an elevation, or an altitude) within that radius.

Some embodiments of the present invention employ a cognitive system. The use of a cognitive system allows identification of geographic restrictions. A cognitive system parses various inputs (e.g., social network posts, public postings, etc.) through natural language processing (NLP) and/or visual processing to extract core data. In this example, NLP extracts information from an event website that lists a wedding ceremony for 2:00 pm at a park the next day. Based on this extracted information, a high level of confidence is associated with geographic restrictions associated with the occurrence of a wedding in the park (e.g., geographic restriction of an elevation floor over a specified area of the park). Alternatively, visual processing extracts information from a video and/or an image to determine geographic restrictions based, at least in part, on information extracted from the video and/or image. For example, visual processing extracts information about a fire from a video on a news website and determines that a geographic restriction includes a radius around the fire of 200 feet and an elevation floor above the fire of 1500 feet. In some embodiments, visual processing extracts geotagging information from a video and/or image to determine an absolute location for a geographic restriction.

Processing proceeds to operation S270, where identify settings restrictions mod 308 identifies a set of settings restrictions for a remote controlled vehicle. In some embodiments of the present invention, identify settings restrictions mod 308 identifies a set of settings restrictions. In some of these embodiments, identify settings restrictions mod 308 identifies a set of settings restrictions by searching social media networks. Alternatively, identify settings restrictions mod 308 identifies a set of settings restrictions by searching websites and/or public postings for: (i) police departments, fire departments, and/or other emergency services; (ii) government agencies (e.g., communications agencies, aviation agencies, military agencies); (iii) event and/or facility websites (e.g., parks, wedding venues, concert venues, sporting events); (iv) schools; (v) building plans and/or construction plans; and/or (vi) other locations in which a remote controlled vehicle is restricted based, at least in part, on settings (e.g., within a store). In further embodiments, identify settings restrictions mod 308 identifies a set of settings restrictions based, at least in part, on various settings for a remote controlled vehicle. In some of these embodiments, settings for a remote controlled vehicle include speed restrictions (e.g., speed limits, boating wake restrictions). Alternatively, settings for a remote controlled vehicle include: (i) noise (e.g., horns, engines, motors); (ii) lights (e.g., light emitting diodes (LED), incandescent lights, laser pointers); (iii) photography (e.g., flash photography, video recordings in a movie theater, infrared cameras, night vision cameras); (iv) network connections (e.g., radio interference, internet access); and/or (v) other adjustable features on a remote controlled vehicle. In this example, identify settings restrictions mod 308 identifies a set of settings based, at least in part, on: (i) the park website indicating that remote controlled vehicles are limited to three miles per hour at all times and incandescent lights or LEDS are required at night; and the social media account for the band links to a website that indicates video recordings, laser pointers, and noise makers are not allowed within 300 feet of the stage.

Some embodiments of the present invention employ a cognitive system. The use of a cognitive system allows identification of settings restrictions. A cognitive system parses various inputs (e.g., social network posts, public postings, etc.) through NLP and/or visual processing to extract core data. In this example, NLP extracts information from an event website that lists a wedding ceremony for 2:00 pm at a park the next day. Based on this extracted information, a high level of confidence is associated with settings restrictions associated with the occurrence of a wedding in the park (e.g., settings restriction of noise limitations within a specified radius of the wedding ceremony). Alternatively, visual processing extracts information from a video and/or an image to determine settings restrictions based, at least in part, on information extracted from the video and/or image. For example, visual processing extracts information about a fire from a video on a news website and determines that a settings restriction includes wireless connection restrictions within 500 feet of the fire to avoid interference with emergency responders. In some embodiments, visual processing extracts geotagging information from a video and/or image to determine an absolute location for a settings restriction.

Processing proceeds to operation S275, where predict future restrictions mod 310 predicts a set of future restrictions for a remote controlled vehicle. In some embodiments of the present invention, predict future restrictions mod 310 predicts a set of future restrictions on a remote controlled vehicle. In some of these embodiments, predict future restrictions mod 310 performs additional searches for geographic restrictions and/or settings restrictions for future time intervals. In some of these embodiments, predict future restrictions mod 310 predicts a set of future geographic restrictions and/or a set of future geographic restrictions for discrete time intervals. Alternatively, predict future restrictions mod 310 predicts a set of a set of future geographic restrictions and/or a set of future geographic restrictions on a continuous basis. In some embodiments of the present invention, predict future restrictions mod 310 determines an ability of a remote controlled vehicle to comply with a set of geographic restrictions, a set of future geographic restrictions, a set of settings restrictions, and/or a set of future settings restrictions. In some embodiments, predict future restrictions mod 310 predicts a set of future geographic restrictions that include a geo-fence. In some of these embodiments, a geo-fence moves over time. Further embodiments use a cognitive system to parses various inputs NLP and/or visual processing. In this example, predict future restrictions mod 310 predicts that the set of geographic restrictions and the set of settings restrictions related to the concert will end within three hours, based on a historical search of prior concerts by the band and the length of time the band was on stage.

Processing proceeds to operation S280, where adjust location mod 312 adjusts a geographic location for a remote controlled vehicle. In some embodiments of the present invention, adjust location mod 312 adjusts a geographic location. In some of these embodiments, adjust location mod 312 adjusts an absolute geographic location of a remote controlled vehicle. Alternatively, adjust location mod 312 adjusts a relative geographic location of a remote controlled vehicle. In other embodiments, adjust location mod 312 transmits commands to a remote controlled vehicle to adjust a geographic location. Alternatively, adjust location mod 312 restricts signals received by a remote controlled vehicle. A signal received by a remote controlled vehicle is an instruction to continue, maintain, and/or change a direction, speed and/or setting. In other embodiments, adjust location mod 312 restricts signals received by a remote controlled vehicle that would direct the remote controlled vehicle into a restricted geographic location. In further alternative embodiments, adjust location mod 312 restricts signals received by a remote controlled vehicle that would direct the remote controlled vehicle further into a restricted geographic location. Alternatively, adjust location mod 312 restricts signals received by a remote controlled vehicle such that only signals to direct the remote controlled vehicle out of a restricted geographic location are permitted. Further embodiments use a cognitive system to parses various inputs NLP and/or visual processing. In this example, adjust location mod 312 adjusts the location of John's remote controlled car by limiting signals received by the car that would direct the remote controlled car into the restricted area.

Processing terminates at operation S285, where adjust settings mod 314 adjusts a set of settings for a remote controlled vehicle. In some embodiments of the present invention, adjust settings mod 314 adjusts a set of settings. In some of these embodiments, adjust settings mod 314 adjusts a set of a binary settings for a remote controlled vehicle. Alternatively, adjust settings mod 314 adjusts a set of variable settings of a remote controlled vehicle. A binary setting is a setting that has two states (e.g., on and off). A variable setting is a setting that has a plurality of states (e.g., gears of a transmission) and/or a setting that has a continuous range of states (e.g., speed). In other embodiments, adjust settings mod 314 transmits commands to a remote controlled vehicle to adjust a set of settings. Alternatively, adjust settings mod 314 restricts signals received by a remote controlled vehicle. In other embodiments, adjust settings mod 314 restricts signals received by a remote controlled vehicle that would direct the remote controlled vehicle to adjust a setting to a restricted state. In further alternative embodiments, adjust settings mod 314 restricts signals received by a remote controlled vehicle that would direct the remote controlled vehicle to adjust a setting to a restricted state that is further from a non-restricted state (e.g., increasing speed while above a speed limit). Alternatively, adjust settings mod 314 restricts signals received by a remote controlled vehicle such that only signals to direct the remote controlled vehicle to adjust a setting to an allowed state are permitted. In this example, adjust settings mod 314 adjusts the settings of John's remote controlled car by changing the state of the horn to an "off" position.

III. Further Comments and/or Embodiments

Some embodiments of the present invention recognize the following facts, potential problems, and/or potential areas for improvement with respect to the current state of the art: (i) remote controlled vehicles can cause safety issues if the remote controlled vehicles enter restricted areas; and/or (ii) remote controlled vehicles cause noise disturbances when operated in some areas.

Figure 4A:
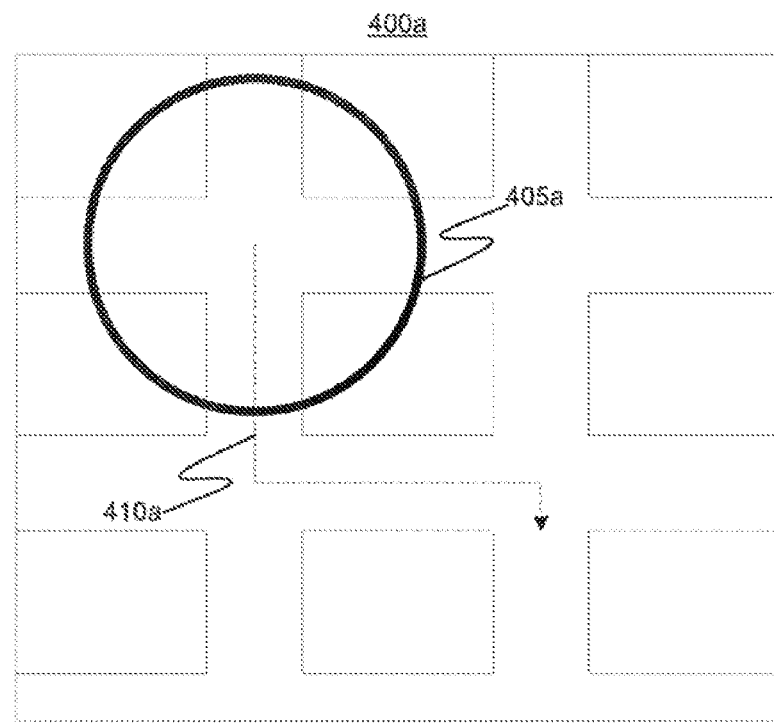
FIG. 4A is a screenshot of a geographic restriction environment according to a second embodiment of a system according to the present invention.

FIG. 4A represents screenshot 400A showing a geographic restriction environment. In this example, screenshot 400A shows a screenshot of a nine city block area for a parade. Geographic restriction 405a shows a current geographic restriction for remote controlled vehicles. In some embodiments of the present invention, geographic restriction 405a is a geo-fence. In this example, remote controlled vehicles are not allowed to operate within geographic restriction 405a. Predicted route 410a shows a predicted route for the parade through the city area.

Figure 4B:
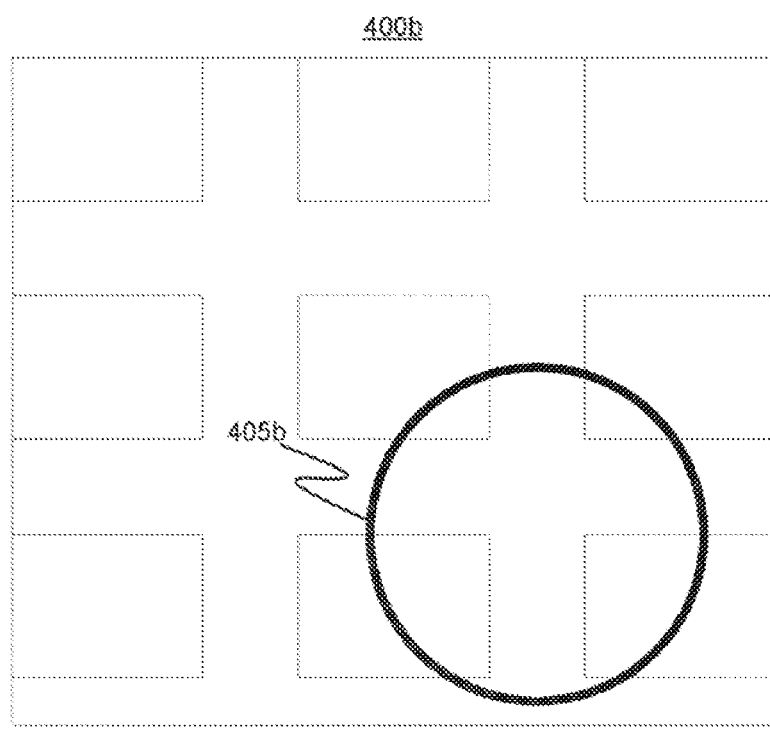
FIG. 4B is a screenshot of a geographic restriction environment according to the second embodiment system.

FIG. 4B represents screenshot 400B showing a geographic restriction environment. In this example, screenshot 400B shows a screenshot of the nine city block area for the parade, as shown in screenshot 400A. However, screenshot 400B occurs after the parade has moved through the city area. Geographic restriction 405b shows a current geographic restriction for remote controlled vehicles. In some embodiments of the present invention, geographic restriction 405b is a geo-fence. In this example, remote controlled vehicles are not allowed to operate within geographic restriction 405b. Geographic restriction 405b surrounds a different segment of the city area than does geographic restriction 405a. Specifically, geographic restriction 405b is a geographic restriction that occurs temporally later than geographic restriction 405a and is located at the end of the parade through the city area, see predicted route 410a. In some embodiments, geographic restriction 405a and geographic restriction 405b represent movement of a geo-fence over a period of time.

Some embodiments of the present invention dynamically generate updated geographic location restrictions for a remote controlled vehicle. In some embodiments, geographic restrictions include an altitude. Some embodiments base location restrictions on current and/or predicted conditions. In some embodiments, restrictions include avoiding paths of emergency services vehicles and/or emergency services personnel. In some embodiments, restrictions include: (i) noise limits; (ii) avoiding public gatherings; and/or (iii) audiovisual recording restrictions. In some embodiments, a remote controlled vehicle is automatically removed from a restricted zone. Alternatively, a controller for a remote controlled vehicle is prevented from transmitting instructions to the remote controlled vehicle that would violate a restriction. Some embodiments of the present invention prevent safety issues presented by remote controlled vehicles.

Some remote controlled vehicles create a significant amount of noise during operation. This noise can be distracting to others around the remote controlled vehicle. Some geographic restrictions and/or settings restrictions prevent a remote controlled vehicle from operating in a manner that would cause disruption due to noise. Some aerial remote controlled vehicles create a safety risk inherent to flying overhead. Some geographic restrictions limit these safety risks by restricting aerial locations over densely populated areas. Some geographic restrictions and/or settings restrictions relate to use of audiovisual equipment Some remote controlled vehicles include audiovisual equipment. Some audiovisual equipment transmits audiovisual data from a remote controlled vehicle to a receiver that is not mechanically connected to the remote controlled vehicle. For example, a remote controlled vehicle is operated through the use of a mounted camera that transmits visual information and the visual information is used by an operator to maneuver the remote controlled vehicle. Some geographic restrictions and/or settings restrictions restrict the use of audiovisual equipment.

Some embodiments dynamically determine current geographic restrictions and/or current settings conditions. Some embodiments dynamically predict future restrictions. In some embodiments, it is determine whether it is safe to operate a remote controlled vehicle in a geographic location (with respect to location, altitude, speed, and/or settings). In some embodiments, geographic restrictions and/or settings restrictions are created by a government entity and/or a pseudo-government entity.

Some embodiments of the present invention provide dynamic and/or predictive recommendations for geographic restrictions and/or settings restrictions. In some embodiments of the present invention, geographic restrictions include an altitude. Alternatively, settings restrictions include an altitude. In further embodiments, settings restrictions include a speed. In some embodiments, a restriction update sub-system connects to a remote controlled vehicle over a cloud. In some embodiments, a restriction update sub-system performs analytic techniques (e.g., image analysis, event analysis, natural language processing, and/or predictive analysis) to determine restrictions for a remote controlled vehicle. Some embodiments update geographic restrictions and/or settings restrictions continually and/or dynamically and/or in real time. In some embodiments, restrictions are enforced by a restriction update sub-system to keep a remote controlled vehicle from violating a restriction. Some embodiments dynamically update restrictions for a remote controlled vehicle using visual, textual, and/or predictive analytics to determine where the remote controlled vehicle is allowed to operate and/or how the remote controlled vehicle is allowed to operate.

Some embodiments dynamically update restrictions for remote controlled vehicles using predictions for future restrictions based, at least in part, on movement of groupings of people over time. Some embodiments process and/or manage restrictions using a cloud-based server. In some embodiments, a restriction update sub-system enforces restrictions using software in a remote controlled vehicle. In some embodiments, a restriction update sub-system determines restrictions based, at least in part, on inputs from a set of audiovisual components attached to a remote controlled vehicle. In some embodiments, a restriction update sub-system determines restrictions based, at least in part, on inputs from a set of social networks. In some embodiments, a restriction update sub-system determines restrictions based, at least in part, on a set of event calendars. In some embodiments, a restriction update sub-system determines restrictions based, at least in part, on a set of emergency broadcasts. In some embodiments, a restriction update sub-system determines restrictions based, at least in part, on a set of government restrictions. In some embodiments, a restriction update sub-system determines restrictions based, at least in part, on a set of inputs.

In some embodiments, a restriction update sub-system determines a geographic location for a remote controlled vehicle based, at least in part, on analysis of audiovisual data from the remote controlled vehicle. In some embodiments, a restriction update sub-system determines a geographic location for a remote controlled vehicle based, at least in part, on an analysis of a set of social networks. In some embodiments, a restriction update sub-system determines a geographic location for a remote controlled vehicle based, at least in part, on a set of event calendars. In some embodiments, a restriction update sub-system determines a geographic location for a remote controlled vehicle based, at least in part, on natural language processing of social network posts. In some embodiments, a restriction update sub-system determines a geographic location for a remote controlled vehicle based, at least in part, on a predictive analysis using historical data. Some embodiments of the present invention use applications on smartphones to control a remote controlled vehicle.

Some embodiments of the present invention may include one, or more, of the following features, characteristics, and/or advantages: (i) predicting an event in a location; (ii) predicting a probably occurrence time for an event; (iii) analyzing images and/or unstructured text data that indicate a probability of an event occurring; (iv) capturing data using websites, social media platforms, and/or a set of sensors; (v) creating a set of settings restrictions and/or a set of geographical restrictions for a set of remote controlled vehicles; (vi) altering a set of settings for a remote controlled vehicle to comply with a set of settings restrictions; (vii) altering a geographic location of a remote controlled vehicle to comply with a set of geographic restrictions.

IV. Definitions

"Present invention" does not create an absolute indication and/or implication that the described subject matter is covered by the initial set of claims, as filed, by any as-amended set of claims drafted during prosecution, and/or by the final set of claims allowed through patent prosecution and included in the issued patent. The term "present invention" is used to assist in indicating a portion or multiple portions of the disclosure that might possibly include an advancement or multiple advancements over the state of the art. This understanding of the term "present invention" and the indications and/or implications thereof are tentative and provisional and are subject to change during the course of patent prosecution as relevant information is developed and as the claims may be amended.

"Embodiment," see the definition for "present invention."

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

A "set of" items means there exists one or more items; there must exist at least one item, but there can also be two, three, or more items. A "subset of" items means there exists one or more items within a grouping of items that contain a common characteristic.

A "plurality of" items means there exists at more than one item; there must exist at least two items, but there can also be three, four, or more items.

"Includes" and any variants (e.g., including, include, etc.) means, unless explicitly noted otherwise, "includes, but is not necessarily limited to."

A "user" or a "subscriber" includes, but is not necessarily limited to: (i) a single individual human; (ii) an artificial intelligence entity with sufficient intelligence to act in the place of a single individual human or more than one human; (iii) a business entity for which actions are being taken by a single individual human or more than one human; and/or (iv) a combination of any one or more related "users" or "subscribers" acting as a single "user" or "subscriber."

The terms "receive," "provide," "send," "input," "output," and "report" should not be taken to indicate or imply, unless otherwise explicitly specified: (i) any particular degree of directness with respect to the relationship between an object and a subject; and/or (ii) a presence or absence of a set of intermediate components, intermediate actions, and/or things interposed between an object and a subject.

A "module" is any set of hardware, firmware, and/or software that operatively works to do a function, without regard to whether the module is: (i) in a single local proximity; (ii) distributed over a wide area; (iii) in a single proximity within a larger piece of software code; (iv) located within a single piece of software code; (v) located in a single storage device, memory, or medium; (vi) mechanically connected; (vii) electrically connected; and/or (viii) connected in data communication. A "sub-module" is a "module" within a "module."

A "computer" is any device with significant data processing and/or machine readable instruction reading capabilities including, but not necessarily limited to: desktop computers; mainframe computers; laptop computers; field-programmable gate array (FPGA) based devices; smart phones; personal digital assistants (PDAs); body-mounted or inserted computers; embedded device style computers; and/or application-specific integrated circuit (ASIC) based devices.

"Electrically connected" means either indirectly electrically connected such that intervening elements are present or directly electrically connected. An "electrical connection" may include, but need not be limited to, elements such as capacitors, inductors, transformers, vacuum tubes, and the like.

"Mechanically connected" means either indirect mechanical connections made through intermediate components or direct mechanical connections. "Mechanically connected" includes rigid mechanical connections as well as mechanical connection that allows for relative motion between the mechanically connected components. "Mechanically connected" includes, but is not limited to: welded connections; solder connections; connections by fasteners (e.g., nails, bolts, screws, nuts, hook-and-loop fasteners, knots, rivets, quick-release connections, latches, and/or magnetic connections); force fit connections; friction fit connections; connections secured by engagement caused by gravitational forces; pivoting or rotatable connections; and/or slidable mechanical connections.

A "data communication" includes, but is not necessarily limited to, any sort of data communication scheme now known or to be developed in the future. "Data communications" include, but are not necessarily limited to: wireless communication; wired communication; and/or communication routes that have wireless and wired portions. A "data communication" is not necessarily limited to: (i) direct data communication; (ii) indirect data communication; and/or (iii) data communication where the format, packetization status, medium, encryption status, and/or protocol remains constant over the entire course of the data communication.

The phrase "without substantial human intervention" means a process that occurs automatically (often by operation of machine logic, such as software) with little or no human input. Some examples that involve "no substantial human intervention" include: (i) a computer is performing complex processing and a human switches the computer to an alternative power supply due to an outage of grid power so that processing continues uninterrupted; (ii) a computer is about to perform resource intensive processing and a human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

"Automatically" means "without any human intervention."

The term "real time" includes any time frame of sufficiently short duration as to provide reasonable response time for information processing as described. Additionally, the term "real time" includes what is commonly termed "near real time," generally any time frame of sufficiently short duration as to provide reasonable response time for on-demand information processing as described (e.g., within a portion of a second or within a few seconds). These terms, while difficult to precisely define, are well understood by those skilled in the art.

What is claimed is:

1. A computer implemented method, comprising:
    determining a first geographic location of a remote controlled vehicle;
    identifying a first set of states of settings and a set of settings restrictions for the remote controlled vehicle, based at least in part, on a cognitive system, wherein the cognitive system includes:
        a natural language processor, and
        a visual processor,
        the set of settings restrictions being identified based on extracted data extracted by parsing social media input through visual processing by the cognitive system, the social media input being received by the remote controlled vehicle after the first geographic location of the remote controlled vehicle is determined; and
    adjusting the first set of states for the set of settings to a second set of states for the set of settings based, at least in part, on the first geographic location;
    wherein at least determining the first geographic location is performed by computer software running on computer hardware.

2. The method of claim 1, wherein the remote controlled vehicle contains a video camera.

3. The method of claim 1, wherein the remote controlled vehicle is an aircraft.

4. The method of claim 1, wherein the settings restrictions for the remote controlled vehicle include an altitude.

5. The method of claim 1, further comprising:
    predicting a set of future settings restrictions for the remote controlled vehicle based, at least in part, on the cognitive system; and
    adjusting the second set of states for the set of settings to a third set of states for the set of settings based, at least in part, on the set of future settings restrictions.

6. The method of claim 5, further comprising:
adjusting the first geographic location to a second geographic location based, at least in part, on the set of future settings restrictions.

7. The method of claim 5, wherein the set of settings restrictions includes a settings restriction for video recording.

8. A computer program product comprising:
a non-transitory computer readable storage medium having stored thereon:
first instructions executable by a device to cause the device to determine a first geographic location of a remote controlled vehicle;
second instructions executable by a device to cause the device to identify a first set of states of settings and a set of settings restrictions for the remote controlled vehicle, based at least in part, on a cognitive system, wherein the cognitive system includes:
a natural language processor, and
a visual processor,
the set of settings restrictions being identified based on extracted data extracted by parsing social media input through visual processing by the cognitive system, the social media input being received by the remote controlled vehicle after the first geographic location of the remote controlled vehicle is determined; and
third instructions executable by a device to cause the device to adjust the first set of states for the set of settings to a second set of states for the set of settings based, at least in part, on the first geographic location.

9. The computer program product of claim 8, wherein the remote controlled vehicle contains a video camera.

10. The computer program product of claim 8, wherein the remote controlled vehicle is an aircraft.

11. The computer program product of claim 8, wherein the settings restrictions for the remote controlled vehicle include an altitude.

12. The computer program product of claim 8, further comprising:
fourth instructions executable by a device to cause the device to adjust the first geographic location to a second geographic location based, at least in part, on the set of future settings restrictions.

13. The computer program product of claim 12, further comprising:
fifth instructions executable by a device to cause the device to predict a set of future settings restrictions for the remote controlled vehicle; and
sixth instructions executable by a device to cause the device to adjust the second set of states for the set of settings to a third set of states for the set of settings based, at least in part, on the set of future settings restrictions.

14. The computer program product of claim 8, wherein the set of settings restrictions includes a settings restriction for video recording.

15. A computer system comprising:
a processor set; and
a non-transitory computer readable storage medium;
wherein:
the processor set is structured, located, connected, and/or programmed to execute instructions stored on the non-transitory computer readable storage medium; and the instructions include:
first instructions executable by a device to cause the device to determine a first geographic location and settings of a remote controlled vehicle;
second instructions executable by a device to cause the device to identify a first set of states of settings and a set of settings restrictions for the remote controlled vehicle, based at least in part, on a cognitive system, wherein the cognitive system includes
a natural language processor, and
a visual processor,
the set of settings restrictions being identified based on extracted data extracted by parsing social media input through visual processing by the cognitive system, the social media input being received by the remote controlled vehicle after the first geographic location of the remote controlled vehicle is determined; and
third instructions executable by a device to cause the device to adjust the first set of states for the set of settings to a second set of states for the set of settings based, at least in part, on the first geographic location.

16. The computer system of claim 15, wherein the remote controlled vehicle contains a video camera.

17. The computer system of claim 15, wherein the remote controlled vehicle is an aircraft.

18. The computer system of claim 15, wherein the settings restrictions for the remote controlled vehicle include an altitude.

19. The computer system of claim 15, further comprising:
fourth instructions executable by a device to cause the device to adjust the first geographic location to a second geographic location based, at least in part, on the set of future settings restrictions.

20. The computer system of claim 19, further comprising:
fifth instructions executable by a device to cause the device to predict a set of future settings restrictions for the remote controlled vehicle; and
sixth instructions executable by a device to cause the device to adjust the second set of states for the set of settings to a third set of states for the set of settings based, at least in part, on the set of future settings restrictions.

* * * * *